United States Patent Office 3,330,717
Patented July 11, 1967

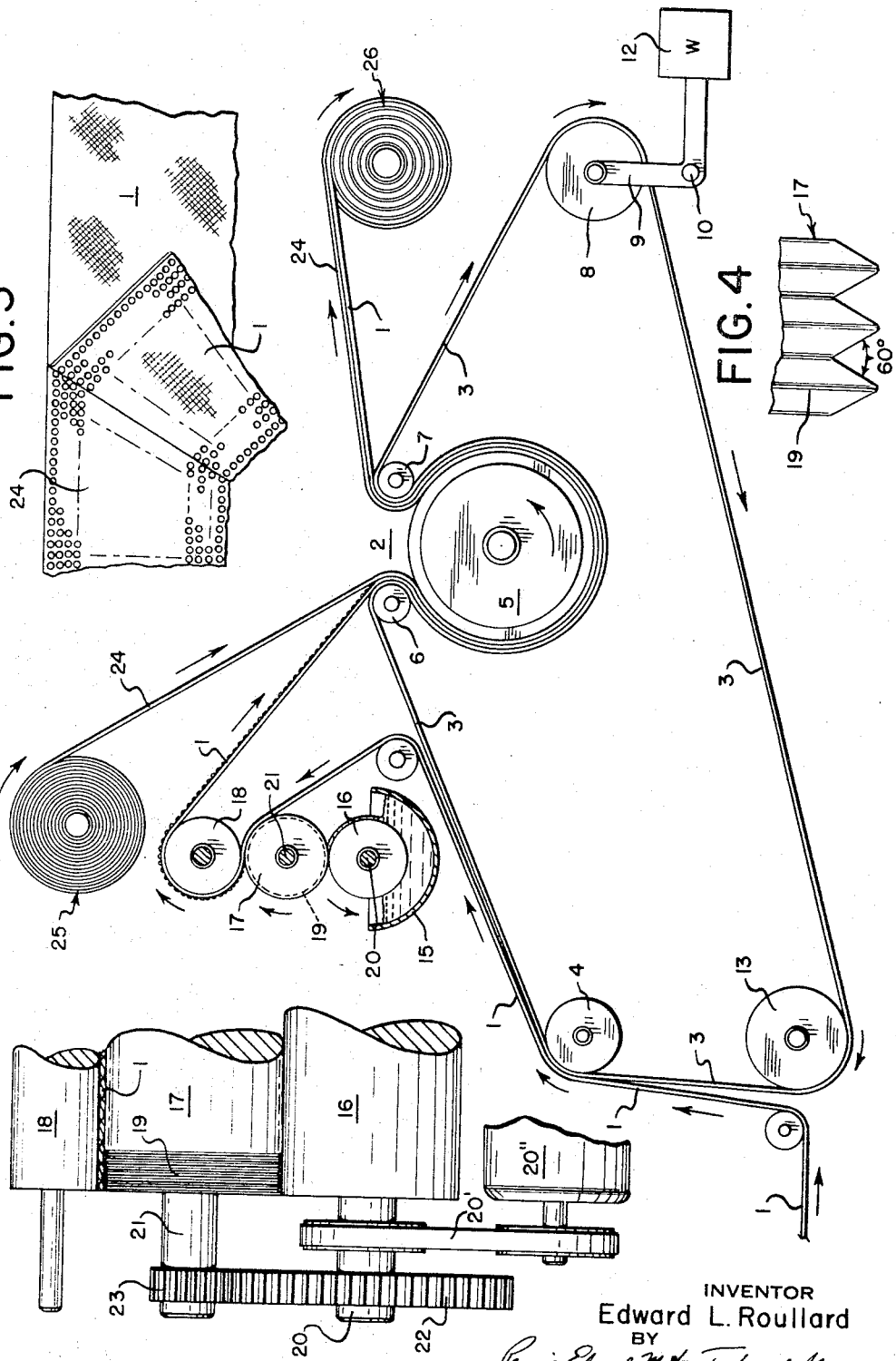

3,330,717
LAMINATING APPARATUS
Edward L. Roullard, Guilford, Maine, assignor, by mesne assignments, to Coin Sales Corporation, New York, N.Y., a corporation of Delaware
Original application June 17, 1963, Ser. No. 288,207, now Patent No. 3,313,668. Divided and this application May 13, 1966, Ser. No. 549,998
9 Claims. (Cl. 156—548)

This application is a divisional of my copending application Ser. No. 288,207 filed June 17, 1963 entitled Laminating Apparatus and Method, now Patent No. 3,313,668.

The present invention relates to the lamination of materials by means of adhesive and more specifically to the lamination of fabrics wherein the application of the adhesive is controlled to assure proper bonding of the materials, assure that the adhesive will remain contained between the outer surfaces of the resulting laminate and to assure that the resulting laminate will remain substantially as flexible as the individual fabrics from which it is composed. In addition, the invention relates to the production of a laminated fabric possessing superior drapability and breathability.

When, for example, it is desired to laminate two materials together for subsequent use in manufacturing wearing apparel as where a face fabric is to be provided with a lining material, problems are presently encountered in assuring that ther is sufficient adhesive to effect a proper bond but not an excessive amount which would cause the adhesive to strike through the individual fabrics. This strike through of the adhesive is most serious where one or both of the materials being bonded together are light weight as for example where tricot knit is bonded as a liner to a face fabric since here the adhesive doesn't have as much material to penetrate as it would with a heavier fabric. Furthermore, when a lining is added to a garment fabric, it is also desirable that the composite material have the same or nearly the same draping or hanging characteristics as the garment fabric itself. When the lining is sewn to the garment fabric, there is no problem since the lining is spaced from the garment fabric except for the limited area where the stitches are present. However, when such a lining is adhesively united to the fabric, the resulting laminate tends to be stiff. This not only interferes with the draping qualities of the fabric, but also the breathing qualities of both the garment fabric and lining fabric. More specifically, if the adhesive is applied over the entire opposed surfaces of the garment and lining fabrics, it forms a solid non-porous film and produces, in effect, a three layered structural member; and since the garment and lining fabrics cannot move relative to one another, the natural draping characteristics of the garment fabric are obviously affected. Furthermore, the adhesive itself being solid film has a certain amount of stiffness and this stiffness adds to the stiffness of the individual fabrics. If, alternatively, adhesive is applied at spaced points, a laminate possessing good breathing characteristics is produced, however, strike through of the adhesive is still a problem.

According to the teachings of the present invention, a specifically designed pattern roll is employed for transferring the adhesive from an adhensive supply to the fabric whereby the adhesive is applied to the pattern roll in stripes and transferred to the fabric in uniform droplets or spots. In additional, to prevent strike through of the adhesive, such adhesive is applied to the surface of the fabrics as opposed to being embedded in the fabric by providing relative movement between the pattern roll and the fabric where they are in engagement with each other. Thus, the resulting laminate possesses good draping and breathing characteristic and is void of any adhesive on its outer surfaces.

A fuller understanding of the invention will be obtained by a reading of the following specification and an examination of the accompanying drawings of which:

FIG. 1 is a diagrammatic side elevation of an apparatus for producing the laminated material in accordance with the teachings of the present invention;

FIG. 2 is a side elevation of the adhesive applicator shown in FIG. 1;

FIG. 3 is an enlarged fragmentary view of the laminated material broken open to show the spaced spots of adhesive; and FIG. 4 is an enlarged fragmentary side elevation of the pattern roll shown in FIG. 2.

With reference to the drawings, a web of fabric 1 is fed from a suitable supply, not shown, to the bonding area or location 2 where a flexible pressure apron 3 is located. The pressure apron comprises a continuous belt which is driven in the direction of the arrows by the driving roll 4 around a substantial portion of a rotatable cylinder 5. The belt is kept in contact with a substantial portion of the cylinder by means of the guide rolls 6 and 7. The belt after passing around the guide roll 6, cylinder 5, and guide roll 7 is led around a tensioning roll 8. This roll is journaled at one end of the L-shaped brackets, one of which is shown in FIG. 1 at 9. The brackets are, in turn, pivotedly mounted at 10. A weight 12 is positioned at the other end of the brackets 9 so as to continuously urge the tensioning roll 8 to the right as shown in FIG. 1 thus assuring that the apron will be maintained in a taut condition and in engagement with the cylinder 5. After passing around the tensioning roll 8, the belt 3 completes its circuit by being passed around the guide roll 13.

The adhesive applicator comprises an adhesive trough 15, a rotatably mounted adhesive pickup roll 16, a rotatably mounted pattern roll 17 and a rotatably mounted backup roll 18.

As shown in FIG. 2, the adhesive pattern roll is provided on its surface with circumferential grooves 19. In the preferred form of the pattern roll, there are 28 grooves per inch along its entire longitudinal length and the angle defined by the sides of each groove is about 60°, as shown in FIG. 4. The diameter of this roll is about six inches. These grooves may be formed individually or they may be formed as a fine screw thread with 28 threads per inch. The size and depth of these grooves effects the amount of adhesive that will be received from the pickup roll and, in turn, applied to the fabric.

As shown in FIG. 2 the pickup roll 16 and pattern roll 17 are secured on the shafts 20 and 21, respectively, and the two rolls are driven together by means of the gears 22, 23 secured respectively to the shafts 20 and 21. The shaft 20 may be driven through a belt 20′ by a suitable motor 20″ and the gearing is such that the pickup roll rotates at a much slower speed than the pattern roll. With the construction shown in FIG. 2, the gear 22 is provided with three times as many teeth as the gear 23 so as to effect a three to one reduction in speed. If these two rolls were turned at the same surface speeds, the adhesive being transferred from the pickup roll to the pattern roll would tend to bridge over the grooves on the pattern roll thereby putting an excessive amount of adhesive in spaced grooves while leaving the intermediate grooves empty. For example, with equal surfaces speeds, the adhesive might tend to bridge four or five of the threads and this would result in transferring an excessive amount of adhesive onto the fabrics in stripes ¼ inch apart while leaving the intermediate portions bare. By turning the pickup roll at a speed slower than the pattern roll, the pickup roll will in addition act as a doctor blade controlling the amount of adhesive applied to the pattern roll, and accordingly, by changing the relative speeds of the pickup and pattern rolls the amount of adhesive transferred may be varied. With hard finished fabrics, for example, less adhesive may be used to effect a proper bonding. With this arrangement the two rolls will also remain in proper adjustment so as to transfer a uniform amount of adhesive regardless of any small foreign matter that may be present in the adhesive. If a conventional doctor blade were used to control the amount of adhesive, any contamination in the adhesive would tend to become wedged between the doctor blade and the pattern roll and thereby cause an uneven transfer of the adhesive to the pattern roll.

After the adhesive is placed within the grooves 19, it is then carried up to a point between the pattern roll 17 and the backup roll 18. The backup roll may be a very light roll and is spaced at a distance from the pattern roll so as to hold the fabric against the pattern roll thereby assuring proper contact of the fabric with the pattern roll. The backup roll should be spaced from the pattern roll by a distance substantially equal to the thickness of the fabric being passed therebetween so as to avoid any buildup of pressure that would tend to squeeze the fabric into the grooves of the pattern roll.

From FIG. 1 it will be also noted that the pattern roll at the point where the fabric is passed between it and the backup roll is moving in a direction opposite to that of the fabric. With this arrangement the fabric will wipe the adhesive off the pattern roll and the adhesive will not be pushed into the fabric as would be the case if the pattern roll and the fabric were moved in the same direction and pressed into pressure engagement with each other. In other words, by wiping the adhesive off the pattern roll, such adhesive becomes deposited on top of the fabric and not in the fabric. This permits proper bonding with a very thin coat of adhesive since substantially all of the adhesive will be available for contacting the second fabric; and this is an important factor especially where either or both of the fabrics are lightweight and therefore easily penetrated by the adhesive.

As stated above, it is important to apply the adhesive to the fabric at spaced points so as to produce a laminate possessing good breathability and drapability, quantities which are desirable, for example, in laminated apparel. According to the teachings of the present invention, this is accomplished by the above described construction of the pattern roll and by having the fabric, where it is in engagement with the pattern roll, move in a direction opposite that of the pattern roll. As the fabric wipes the adhesive from the grooves of the pattern roll, the surface tension of the adhesive tends to cause the adhesive to contract and since the amount of adhesive contained within the grooves is small, this contraction is sufficient to cause the adhesive to break up into droplets. Accordingly, the adhesive is applied to the fabric in spots as shown clearly in FIG. 3.

The backup roll shown in FIG. 1 may be mounted for free rotation or may be driven in a clockwise direction as viewed in FIG. 1, if desired, where the backup roll is mounted for free rotation, the fabric may be pulled through the space between the pattern roll and the backup roll by means of the pulling forces exerted by the apron 3 and rotatable cylinder 5.

After the fabric has passed between the pattern roll and the backup roll, it is led around the idler roll 6 with the unglued side engaging the pressure apron 3. At this point the second material 24 is fed from a suitable supply 25 into engagement with the glued surface of the fabric 1. Both of these fabrics then pass between the apron 3 and the cylinder 5 and subsequently around the idler roll 7. The engagement of the two fabrics between apron 3 and the cylinder 5 will cause them to become laminated together; and if the adhesive requires heat during the setting, the cylinder itself may be heated by suitable means. After passing from the bonding area, the laminated fabric may be wound up onto a drum 26 driven in the direction of the arrow.

The adhesive used should be one that will withstand washing and dry cleaning fluids when set. If the adhesive used is heat sensitive, it might be found that the heat created in the bonding area 2 will not effect a proper curing of the adhesive so as to withstand subsequent washing and dry cleaning fluids. If such is the case, the material as it comes off the hot cylinder may be fed directly into a baking oven to properly cure the adhesive.

The fabric 1 is shown in the drawings as a single piece of material, however, it is to be understood that this material itself may be composed of more than one layer of fabric, if desired; and it is to be further understood that the above discloses a preferred embodiment of the invention and that various other modifications may be made without departing from the scope of the invention as set forth in the following claims.

I claim:
1. Apparatus for bonding fabric materials together with an adhesive comprising:
 (a) means for feeding a first fabric material in one direction along a predetermined path;
 (b) applicator means for feeding adhesive in the opposite direction along said path and in separate parts spaced from each other transversely of said path;
 (c) means for bringing one surface of said first material into substantially non-pressure contact with said adhesive while said first material and adhesive are moving along said path in opposite directions whereby said adhesive is caused to adhere to said first material on said one surface at spaced locations;
 (d) means for bringing said one surface of the first material into contact with a second fabric material; and
 (e) holding means for holding said materials together to cause them to adhere to each other at said spaced locations.

2. Apparatus for forming a laminated material comprising:
 (a) means for feeding a first material in one direction along a predetermined path;
 (b) applicator means for feeding adhesive in the opposite direction along said path and in continuous lengths spaced from each other transversely of said path;
 (c) means for bringing said first material into contact with said adhesive while said first material and adhesive are moving in opposite directions to cause said adhesive to contract and adhere to said first material on one surface thereof;
 (d) means for controlling the amount of adhesive presented to said first fabric whereby said contraction causes the adhesive to form individual droplets as it is removed from said applicator and becomes adhered to said surface at spaced locations;
 (e) means for feeding a second material into engagement with said one surface; and
 (f) holding means for holding said materials together to unite them at said spaced locations.

3. Apparatus for forming a laminated material as set forth in claim 2 wherein said applicator means includes a pattern roll having a plurality of circumferential grooves.

4. Apparatus for forming a laminated material as set forth in claim 3 wherein said pattern roll is about six inches in diameter and is provided with about 28 circumferential grooves per inch and wherein the surfaces of said grooves meet each other at an angle of about 60°.

5. Apparatus for forming a laminated fabric as set forth in claim 4 wherein said grooves define a screw thread.

6. Apparatus for forming a laminated material comprising:

(a) an adhesive trough for holding a supply of adhesive;
(b) a rotatably mounted pickup roll partially submerged within said adhesive supply;
(c) a rotatably mounted circumferentially grooved pattern roll disposed adjacent said pickup roll and in parallel relationship therewith for receiving adhesive within said grooves from said pickup roll;
(d) means for rotating said pickup roll in a predetermined direction;
(e) coupling means for drivingly connecting said pickup roll to said pattern roll;
(f) a rotatably mounted backup roll spaced from said pattern roll by a distance substantially equal to the thickness of said fabric;
(g) means for feeding a first fabric between said pattern roll and backup roll in a direction opposite the direction of rotation of said pattern roll whereby the adhesive is transferred from the grooves of said pattern roll to one surface of said first fabric;
(h) means for feeding a second fabric into engagement with said one surface of the first fabric after the adhesive has been applied thereto; and
(i) means for holding said fabrics together to unite them together.

7. Apparatus for forming a laminated material as set forth in claim 6 wherein said pattern roll is about six inches in diameter and is provided with about 28 circumferential grooves per inch and wherein the surfaces of grooves meet each other at an angle of about 60°.

8. Apparatus for forming a laminated material as set forth in claim 7 wherein said grooves define a screw thread.

9. Apparatus for forming a laminated material as set forth in claim 7 wherein said coupling means comprises meshing gears for driving said pickup roll at about ⅓ the speed of said pattern roll.

References Cited

UNITED STATES PATENTS

| | | | |
|---|---|---|---|
| Re. 22,842 | 2/1947 | Hill | 156—205 |
| 1,831,403 | 11/1931 | Woodward | 156—548 XR |
| 1,847,065 | 2/1932 | Munch | 117—112 |
| 2,314,318 | 3/1943 | Cunningham | 156—496 |
| 2,793,677 | 5/1957 | Armstrong | 156—536 |
| 2,870,738 | 1/1959 | Jacobs et al. | 118—249 |
| 3,036,927 | 5/1962 | Jerothe | 117—7 |
| 3,251,727 | 5/1966 | Reynolds et al. | 161—148 |
| 3,257,262 | 6/1966 | Epstein | 161—89 |

EARL M. BERGERT, *Primary Examiner.*

H. F. EPSTEIN, *Assistant Examiner.*